(12) United States Patent
MacDonald et al.

(10) Patent No.: US 12,728,458 B2
(45) Date of Patent: Sep. 8, 2026

(54) SYSTEM AND METHOD FOR ADDITIVELY MANUFACTURING AN OBJECT

(71) Applicant: The Boeing Company, Arlington, VA (US)

(72) Inventors: Elaine MacDonald, Wildwood, MO (US); Russell W. Cochran, Maryland Hts., MO (US); Daniel J. Braley, O'Fallon, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/489,244

(22) Filed: Oct. 18, 2023

(65) Prior Publication Data

US 2024/0042527 A1 Feb. 8, 2024

Related U.S. Application Data

(62) Division of application No. 17/359,922, filed on Jun. 28, 2021, now Pat. No. 11,826,824.

(Continued)

(51) Int. Cl.

*B22F 10/66* (2021.01)
*B22F 1/10* (2022.01)

(Continued)

(52) U.S. Cl.

CPC ................ *B22F 10/66* (2021.01); *B22F 1/10* (2022.01); *B22F 10/14* (2021.01); *B33Y 10/00* (2014.12);

(Continued)

(58) Field of Classification Search

CPC .......... B22F 12/60; B22F 12/63; B22F 12/67; B22F 10/14; B22F 10/16; B22F 10/37; B22F 12/30; B22F 12/33

See application file for complete search history.

(56) References Cited

U.S. PATENT DOCUMENTS 5,957,006 A * 9/1999 Smith ...................... B23K 5/00
156/62.2
10,940,533 B2 * 3/2021 Hudelson .................. B22F 3/18

(Continued)

FOREIGN PATENT DOCUMENTS

CN 104858430 A * 8/2015 ............ B22F 3/1241
WO WO-9534468 A1 * 12/1995 ........... B29C 64/357

(Continued)

OTHER PUBLICATIONS

English Translation for CN-104858430-A (Year: 2015).*
China National Intellectual Property Office, Office Action, App. No. 202111061029.7 (Jun. 1, 2026).

*Primary Examiner* — Seyed Masoud Malekzadeh
(74) *Attorney, Agent, or Firm* — Walters & Wasylyna LLC

(57) ABSTRACT

A method of additively manufacturing an object includes successively forming a plurality of powder layers by depositing powder over a build platform using a powder-deposition apparatus. The method also includes successively forming a binder shell by bonding select regions of each one of the plurality of powder layers before forming each successive one of the plurality of powder layers using a binder-delivery apparatus. The binder shell encloses a portion of the powder. The method further includes densifying the portion of the powder bound by the binder shell using a consolidation apparatus.

20 Claims, 8 Drawing Sheets

Related U.S. Application Data

(60) Provisional application No. 62/706,813, filed on Sep. 11, 2020.

(51) Int. Cl.

| | |
|---|---|
| ***B22F 10/14*** | (2021.01) |
| ***B22F 12/60*** | (2021.01) |
| ***B33Y 10/00*** | (2015.01) |
| ***B33Y 30/00*** | (2015.01) |
| ***B33Y 40/20*** | (2020.01) |
| *B22F 10/16* | (2021.01) |
| *B22F 10/37* | (2021.01) |
| *B22F 12/30* | (2021.01) |
| *B22F 12/33* | (2021.01) |
| *B22F 12/63* | (2021.01) |
| *B22F 12/67* | (2021.01) |

(52) U.S. Cl.

CPC ............... *B33Y 30/00* (2014.12); *B33Y 40/20* (2020.01); *B22F 10/16* (2021.01); *B22F 10/37* (2021.01); *B22F 12/30* (2021.01); *B22F 12/33* (2021.01); *B22F 12/60* (2021.01); *B22F 12/63* (2021.01); *B22F 12/67* (2021.01); *B22F 2202/01* (2013.01)

(56) References Cited

U.S. PATENT DOCUMENTS

| | | | | |
|---|---|---|---|---|
| 12,023,852 | B2 * | 7/2024 | Lavi | B22F 10/50 |
| 2005/0079086 | A1 * | 4/2005 | Farr | B33Y 10/00 419/36 |
| 2017/0120521 | A1 * | 5/2017 | Sakura | B22F 12/63 |
| 2018/0333778 | A1 * | 11/2018 | Sloderbeck | B22F 12/37 |
| 2019/0033828 | A1 * | 1/2019 | Madelone, Jr. | B22F 10/80 |
| 2020/0206810 | A1 * | 7/2020 | Lavi | B22F 10/22 |
| 2022/0055102 | A1 * | 2/2022 | Lavi | B29C 64/268 |
| 2022/0305550 | A1 * | 9/2022 | Lavi | B29C 64/40 |

FOREIGN PATENT DOCUMENTS

| | | | | |
|---|---|---|---|---|
| WO | WO-2020014028 | * | 1/2020 | B29C 64/357 |
| WO | WO-2020014028 | A1 * | 1/2020 | B33Y 30/00 |

* cited by examiner

SYSTEM AND METHOD FOR ADDITIVELY MANUFACTURING AN OBJECT

PRIORITY

This application is divisional of U.S. Ser. No. 17/359,922 filed on Jun. 28, 2021, which claims priority from U.S. Ser. No. 62/706,813 filed on Sep. 11, 2020.

FIELD

The present disclosure relates generally to additive manufacturing and, more particularly, to systems and methods for powder bed binder jetting additive manufacturing to form an object from a powder material.

BACKGROUND

Metal injection molding (MIM) is a metalworking process in which powdered metal is mixed with one or more binders to create a feedstock. The feedstock is then injected as a liquid into a mold using injection molding. The molded or "green part" is then cooled and removed from the mold. After molding, the green part undergoes a conditioning operation (e.g., using solvent, thermal furnaces, catalytic process, or a combination of methods) to remove a portion of the binder and produce a "brown part." The brown part then undergoes a sintering operation to remove the remaining portion of the binder, densify the metal particles, and produce a "finished part." MIM advantageously provides cost-effective production of high volume and/or complex parts. However, MIM requires expensive permanent tooling, which may not be cost effective for production of low volume parts.

Metal binder jetting may offer a cost-effective alternative to the MIM process for production of low volume parts. In metal binder jetting, a liquid binder is selectively applied to join metal powder particles, layer-by-layer, to form the brown part. The brown part then undergoes a sintering operation to remove the binder, densify the metal particles, and produce the finished part.

However, in both MIM and metal binder jetting, the metal particles may encapsulate some of the binder prior to outgassing of all the binder during densification in the sintering operation. This can result in inclusions of binder within the finished part and/or a less than desirable density of the final part. This is particularly problematic in the production of relatively thick parts. Accordingly, those skilled in the art continue with research and development efforts to provide improved additive manufacturing techniques, such as powder bed binder jetting additive manufacturing.

SUMMARY

The following is a non-exhaustive list of examples, which may or may not be claimed, of the subject matter according to the present disclosure.

In an example, a disclosed additive manufacturing system includes a build platform. The additive manufacturing system also includes a powder deposition apparatus configured to deposit powder such that a plurality of powder layers is successively formed over the build platform. The additive-manufacturing system further includes a binder-delivery apparatus configured to deliver binder at select regions of each successive one of the plurality of powder layers such that a binder shell is successively formed. The additive manufacturing system additionally includes a consolidation apparatus configured to densify a portion of the powder bound by the binder shell.

In another example, the disclosed additive manufacturing system includes a build platform. The additive manufacturing system also includes a powder-deposition apparatus that is configured to deposit powder such that a plurality of powder layers is successively formed over the build platform. The additive manufacturing system further includes a binder-delivery apparatus that is configured to deliver binder at select regions of each successive one of the plurality of powder layers such that a binder shell is successively formed. The binder shell includes bonded powder and at least partially encloses a powder core including unbonded powder. The additive manufacturing system additionally includes a tamping mechanism that is configured to apply a compression force for packing the unbonded powder bound by the binder shell.

In an example, a disclosed method of additively manufacturing an object includes steps of: (1) successively forming a plurality of powder layers by depositing powder; and (2) successively forming a binder shell by bonding select regions of each one of the plurality of powder layers before forming each successive one of the plurality of powder layers. The binder shell encloses a portion of the powder.

In an example, a disclosed additively manufacturing object is made by a process that includes steps of: (1) successively forming a plurality of powder layers by depositing powder; and (2) forming a binder shell by bonding select regions of each one of the plurality of powder layers to successively form a plurality of shell layers of the binder shell before forming each successive one of the plurality of powder layers. The binder shell encloses a powder core.

Other examples of the disclosed additive manufacturing system, method, and additively manufactured object will become apparent from the following detailed description, the accompanying drawings, and the appended claims

DETAILED DESCRIPTION

Figure 1:
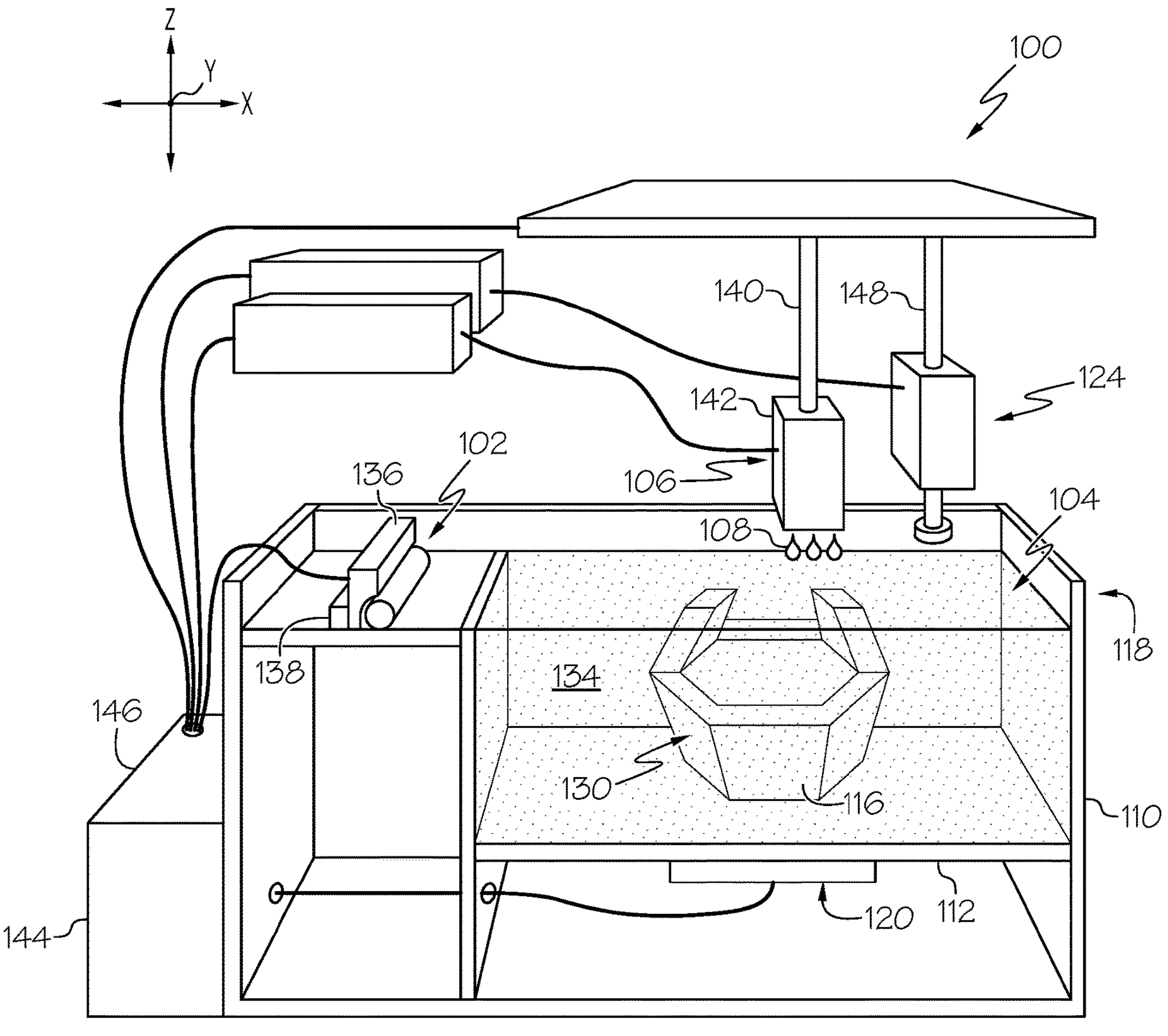
FIG. 1 is a schematic illustration of an example of the additive manufacturing system.

The following detailed description refers to the accompanying drawings, which illustrate specific examples of the subject matter disclosed herein. Other examples having different structures and operations do not depart from the scope of the present disclosure Like reference numerals may refer to the same feature, element, or component in the different drawings. Throughout the present disclosure, any one of a plurality of items may generally be referred to individually as the item and a plurality of items may generally be referred to collectively as the items.

Illustrative, non-exhaustive examples, which may be, but are not necessarily, claimed, of the subject matter disclosed herein are provided below. Reference herein to "example" means that one or more feature, structure, element, component, characteristic, and/or operational step described in connection with the example is included in at least one aspect, embodiment, and/or implementation of the subject matter disclosed herein. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

The present disclosure recognizes that powder bed binder jetting additive manufacturing provides for cost-effective production of complex parts. The present disclosure also recognizes that relatively thick parts produced by powder bed binder jetting additive manufacturing may have foreign object inclusions in the form of unremoved binder or an undesirable porosity, which may reduce the mechanical properties of the part and restrict the design space for powder bed binder jetting additive manufacturing. As such current powder bed binder jetting additive manufacturing processes may not be recommended for production of relatively thick parts, such as those having a thickness of greater than 0.125 inch (3.175 millimeters). The present disclosure also recognizes that if a design requires a part to have a relatively thick portion, the sintering operation must operate at a lower temperature for a longer operating time, which increases process cycle time and overall production costs. The present disclosure additionally recognizes that the sintering operation used in powder bed binder jetting additive manufacturing may cause non-homogenous shrinkage to the brown part due to less than desirable densification and/or uniformity of the powder.

Referring generally to FIGS. 1-13, by way of examples, the present disclosure is directed to an additive manufacturing system 100 (referred to generally herein as system), a method 1000 of additively manufacturing an object 130, and the object 130 made using the system 100 and/or according to the method 1000.

In one or more examples, the system 100 and the method 1000 are implementations of powder bed binder jetting manufacturing used to make the object 130 from a powder 104. The present disclosure recognizes that there are production and design flexibility advantages to manufacturing an object or other part using powder bed binder jetting manufacturing. The present disclosure also recognizes potential problems in manufacturing an object or other part using powder bed binder jetting manufacturing, such as those identified herein above. Examples of the system 100 and the method 1000 provide a solution to these potential problems.

Examples of the system 100 and the method 1000 facilitate formation of the object 130 in a "brown" condition. In the brown condition, the object 130 includes an outer, or exterior, binder shell 116 (FIGS. 1 and 6) formed of bonded powder 104 and in inner, or interior, powder core 150 (FIG. 6) formed of unbonded (e.g., loose) powder 104 that is bound by the binder shell 116. Examples of the system 100 and the method 1000 also facilitate an increase in density of the powder core 150 of the object 130 (in the brown condition) and, thus, an increase in density of the object 130 (in a finished condition) following a sintering process. Examples of the system 100 and the method 1000 also enable the object 130 (in the finished condition) to maintain designed or intended mechanical properties following the sintering process by eliminating inclusion of binder, reducing porosity, and achieving near full density. Thus, examples of the system 100 and the method 1000 beneficially expand the design space for powder bed binder jetting manufacturing and facilitate a fast, low cost solution for production of the object 130 without the need for expensive and long-lead permanent tooling.

Generally, the powder 104 includes any powder material that is suitable to be joined layer-by-layer to make the binder shell 116 and that is suitable to be solidified, such as by a sintering operation. Preferred examples of the powder 104 include metallic powder and metallic alloy powder. However, the powder 104 is not limited to metallic/metallic allow powder and may also include ceramic powder, polymeric powder, and the like. In other examples, the powder 104 may include a combination of different types of powder material or constituent powders.

Generally, the object 130 includes any additively manufactured object made using the system 100 and/or made in accordance with the method 1000. For example, the object 130 includes any article, part, component, or other three-dimensional structure that is manufacturing by a powder bed binder jetting additive manufacturing process. As will be described in more detail herein, in one or more examples, the object 130 may take the form of a "brown part." In one or more examples, the object 130 may take the form of a "finished part."

FIG. 1 schematically illustrates an example of the system 100. In one or more examples, the system 100 includes a build platform 112, a powder-deposition apparatus 102, a binder-delivery apparatus 106, and a consolidation apparatus 118. Generally, the system 100 is configured to convert a three-dimensional (3D) model into two-dimensional (2D) layers. The system 100 utilizes a computer numerical control (CNC) accumulation process to deposit the powder 104 and selectively join the powder 104, according to a preprogrammed construction shape of each 2D layer and a preprogrammed tool path (e.g., G-code).

Referring to FIG. 1, in one or more examples, the system 100 includes a build chamber 110. The build platform 112 is located in the build chamber 110. For the purpose of illustration, a front wall (or front rail) of the build chamber 110 is omitted in FIG. 1. The build platform 112 is provided to support a powder bed 134 and the object 130 made via a powder bed binder jetting additive manufacturing process.

The build chamber 220 provides a peripheral boundary to the build platform 112 and a peripheral boundary to the powder bed 134.

In one or more examples, a seal (not shown) is in contact with the build platform 112 and the build chamber 110 to ensure that the powder 104 remains in the build chamber 110 during formation of the object 130.

While the illustrative examples depict the build chamber 110 and the build platform 112 as having a square shape in transverse cross-section, in other examples, the build chamber 110 and the build platform 112 may have any geometric shape with a closed cross section, such as a circular shape, an elliptical shape, a rectangular shape, and the like.

In one or more examples, the build platform 112 is movable relative to the powder-deposition apparatus 102 and/or the binder-delivery apparatus 106. In one or more examples, the build platform 112 moves vertically (e.g., is lowered) within the build chamber 110 relative to the powder-deposition apparatus 102 and/or the binder-delivery apparatus 106 as successive ones of the plurality of powder layers 114 and the plurality of shell layers 132 are formed. In one or more examples, the build platform 112 moves horizontally relative to the powder-deposition apparatus 102 as each successive one of the plurality of powder layers 114 is formed and/or relative to the binder-delivery apparatus 106 as each successive one of the plurality of shell layers 132 is formed. In one or more examples, the build platform 112 rotates about a vertical axis relative to the powder-deposition apparatus 102 as each one of the plurality of powder layers 114 is formed and/or relative to the binder-delivery apparatus 106 as each one of the plurality of shell layers 132 is formed.

In one or more examples, the system 100 includes a build-platform actuator (not shown) that is coupled to the build platform 112 and that is configured to drive movement of the build platform 112. In one or more examples, the build-platform actuator includes, or takes the form of, a linear actuator. In one or more examples, the build-platform actuator includes a turntable that is coupled to the build platform 112.

The powder-deposition apparatus 102 is configured to deposit the powder 104. In one or more examples, the powder-deposition apparatus 102 is configured to selectively deposit the powder 104 in a powder bed 134 to successively form each one of a plurality of powder layers 114. For example, the powder-deposition apparatus 102 is configured to deposit the powder 104 such that the plurality of powder layers 114 is successively formed over the build platform 112.

In one or more examples, the powder-deposition apparatus 102 is movable relative to the build platform 112. In one or more examples, the powder-deposition apparatus 102 moves horizontally relative to the build platform 222 as each successive one of the plurality of powder layers 114 is formed. In one or more examples, the powder-deposition apparatus 202 moves vertically relative to the build platform 112 as each successive one of the plurality of powder layers 114 is formed. In one or more examples, the powder-deposition apparatus 102 has multiple degrees of freedom to accommodate multi-axis movement for depositing the powder 104 in the powder bed 134.

In one or more examples, the system 100 includes a powder-deposition actuator 138 that is coupled to the powder-deposition apparatus 102. The powder-deposition actuator 138 is configured to drive movement of the powder-deposition apparatus 102. In one or more examples, the powder-deposition actuator 138 includes, or takes the form of, a linear actuator, a robotic actuator arm (e.g., a six-axis robotic actuator arm), and the like.

In one or more examples, the powder-deposition apparatus 102 includes, or takes the form of, a recoater 136 that traverses the powder bed 134 to deposit the powder 104. In one or more examples, the recoater 136 is configured to deposit or discharge the powder 104 in the powder bed 134 to successively form each one of the plurality of powder layers 114. In other examples, the powder-deposition apparatus 102 may include any one of various other types of mechanisms capable of depositing or otherwise discharging the powder 104 in the powder bed 134, such as a powder sprayer or the like.

In one or more examples, the recoater 136 includes a discharge chamber (e.g., a powder feeder or a powder hopper) that is configured to hold the powder 104. The discharge chamber includes a discharge opening for discharging the powder 104. Alternatively, in one or more examples, the system 100 includes a powder chamber (not shown) that is configured to hold a supply of the powder 104 and to stage the powder 104 for deposition in the powder bed 134. The recoater 136 is configured to move the powder 104 from the powder chamber to the build chamber 110 and to deposit the powder 104 in the powder bed 134.

In one or more examples, the recoater 136 includes a roller. In one or more examples, the roller is configured to collect the powder 104 and to deposit the powder 104 on the build platform 112 or on a preceding one of the plurality of powder layers 114. In one or more examples, the roller is configured to level out the powder 104 that has been deposited in the powder bed 134. In one or more examples, the recoater 136, additionally or alternatively, includes a different type of leveling device, such as a blade, that is configured to level out the powder 104 that has been deposited in the powder bed 134.

The binder-delivery apparatus 106 is configured to deposit binder 108 on the powder 104. In one or more examples, the binder-delivery apparatus 106 is configured to selectively join (e.g., bond) the powder 104 of a portion of each one of the plurality of powder layers 114 to successively form each one of a plurality of shell layers 132. For example, the binder-delivery apparatus 106 is configured to deliver the binder 108 at select regions of each successive one of the plurality of powder layers 114 such that a binder shell 116 is successively formed.

In one or more examples, the binder-delivery apparatus 106 is movable relative to the build platform 112. In one or more examples, the binder-delivery apparatus 106 moves horizontally relative to the build platform 112 as each successive one of the plurality of shell layers 132 is formed. In one or more examples, the binder-delivery apparatus 106 moves horizontally relative to the build platform 112 as each successive one of the plurality of shell layers 132 is formed. In one or more examples, the binder-delivery apparatus 106 has multiple degrees of freedom to accommodate multi-axis movement for binding the powder 104 at any location.

In one or more examples, the system 100 includes a binder-delivery actuator 140 that is coupled to the binder-delivery apparatus 106. The binder-delivery actuator 140 is configured to drive movement of the binder-delivery apparatus 106. In one or more examples, the binder-delivery actuator 140 includes, or takes the form of, a linear actuator, a robotic actuator arm (e.g., a six-axis robotic actuator arm), and the like. In one or more examples, the system 100 includes a base (no reference number provided) positioned over the build platform 112 (as illustrated in FIG. 1). In one or more examples, a printhead actuator (e.g., binder-delivery actuator 140) is coupled to the base. In one or more examples, a printhead (e.g., binder-delivery actuator 140) is coupled to and movable relative to the base by the printhead actuator. The printhead is configured to deliver selectively deposit binder to the powder.

The binder 108 includes any binding agent or binder material suitable to bond the powder 104 to form a solid cross-sectional layer of the binder shell 116 (e.g., any one of the plurality of shell layers 132). In one or more examples, the binder-delivery apparatus 106 includes, or takes the form of, a binder jetting printhead 142 that applies (e.g., strategically deposits droplets of) the binder 108 into the powder bed 134 that bonds the powder 104 into a solid layer of material (e.g., shell layer 132).

In one or more examples, the system 200 includes a controller 144. The controller 144 is in communication with operational components of the system 100 via one or more communication lines, such as via wired communication and/or wireless communication. In one or more examples, the controller 144 is configured to generate command signals to control movement and operation of the powder-deposition apparatus 102 and the binder-delivery apparatus 106. For example, the controller 144 selectively controls movement of the powder-deposition apparatus 102 and the binder-delivery apparatus 106 according to a predetermined plan (e.g., G-code), stored in the controller 144, to successively deposit-and-join the powder 104.

In one or more examples, the system 100 includes a power source 146. The power source 146 is configured to provide power to the components of the system 100, as required. In one or more examples, the power source 146 may be a single power source or may include a plurality of power sources working together to provide the necessary power output. Alternatively, the plurality of power sources may operate independently and may individually supply power to particular components of the system 100. The power source 146 may be either an AC or a DC power source or may utilize a combination of AC and DC.

FIGS. 2-6 schematically illustrate an example of a process used to form the object 130 using the system 100 (FIG. 1). Throughout the present disclosure and, particularly, with respect to FIGS. 2-6, the plurality of powder layers 114 may be referred to individually as powder layer 114-1 through powder layer 114-N. Similarly, throughout the present disclosure and, particularly with respect to FIGS. 2-6, the plurality of shell layers 132 may be referred to individually as shell layer 132-1 through shell layer 132-N.

Figure 2:
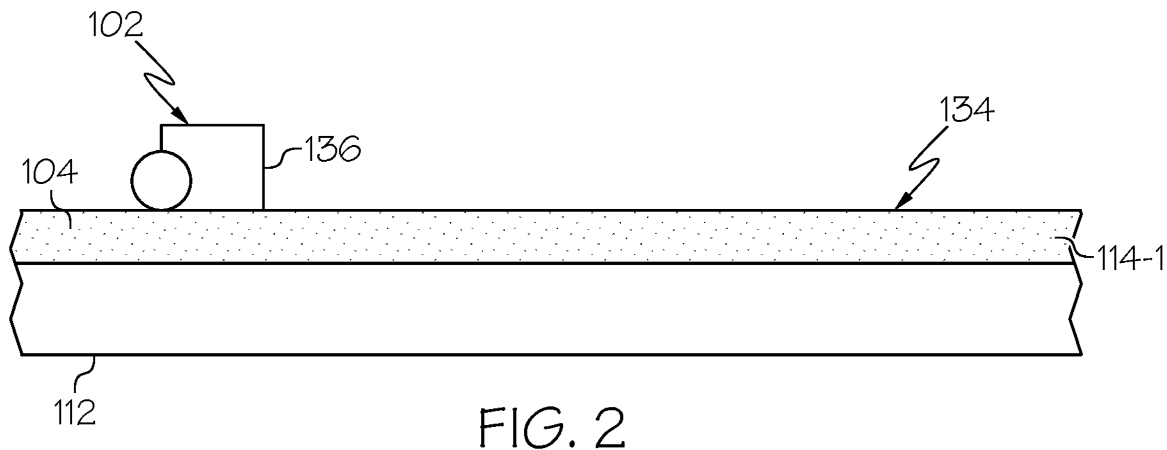
FIGS. 2 to 5, collectively, schematically illustrate an example of successive formation of a plurality of powder layers and successive formation of a plurality of shell layers.
Figure 3:
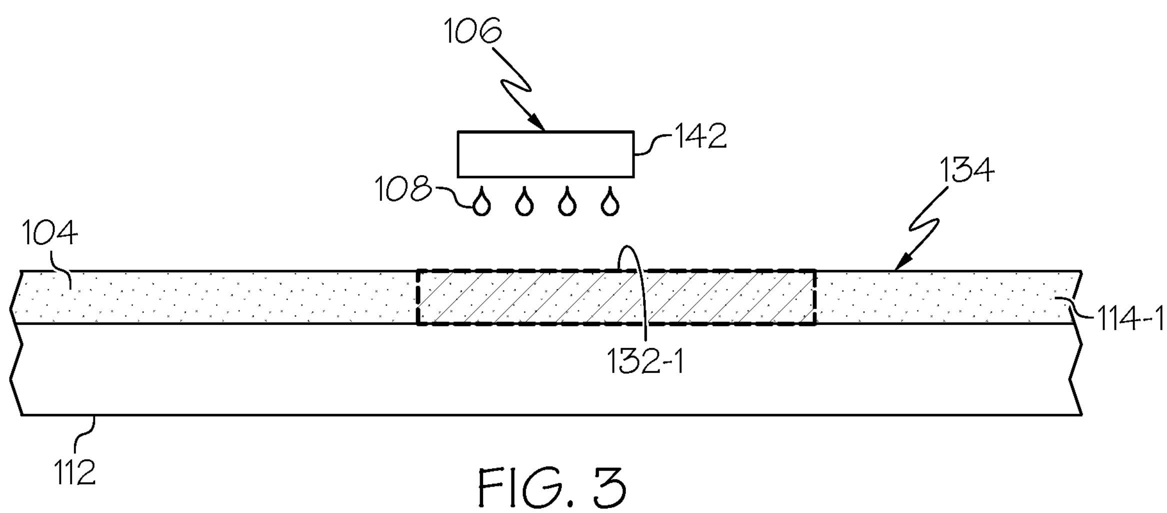

As illustrated in FIG. 2, in one or more examples, under direction from the controller 144, the powder-deposition apparatus 102 traverses the build platform 112 and deposits the powder 104 to form a first (e.g., initial) powder layer 114-1 (e.g., a first one of the plurality of powder layers 114). As illustrated in FIG. 3, after formation of the first powder layer 114-1, under direction from the controller 144, the binder-delivery apparatus 106 is activated and traverses the first powder layer 114-1 to strategically deposit the binder 108 and bond a selected portion of the powder 104 of the first powder layer 114-1. Bonding the selected portion of the powder 104 of the first powder layer 114-1 forms a first shell layer 132-1 (e.g., a first one of the plurality of shell layers 132) of the object 130 on the build platform 112.

In one or more examples, the first shell layer 132-1 forms or defines a bottom portion of the binder shell 116. In one or more examples, the first shell layer 132-1 has a thickness that is approximately equal to a thickness of the first powder layer 114-1. In one or more examples, the thickness of the first shell layer 132-1 is approximately 0.0625 inch (1.587 millimeters). In one or more examples, the thickness of the first shell layer 132-1 is less than approximately 0.0625 inch (1.587 millimeters).

As illustrated in FIG. 3, in one or more examples, the bottom portion of the binder shell 116 is formed entirely by a single shell layer 132 (e.g., the first shell layer 132-1). In other examples, the bottom portion of the binder shell 116 may be formed by more than one shell layer 132 (e.g., a second shell layer formed on the first shell layer, a third shell layer formed on the second shell layer, etc.). The number of shell layers 132 used to form the bottom portion of the binder shell 116 may depend on a desired overall thickness of the binder shell 116, a desired thickness of bottom portion of the binder shell 116, the contour of the bottom portion of the binder shell 116, the overall dimensions of the object 130, the thickness of a given powder layer 114, and a volume and/or density of the powder 104 bound by the binder shell 116 (e.g., the powder core 150), among other factors.

Figure 4:
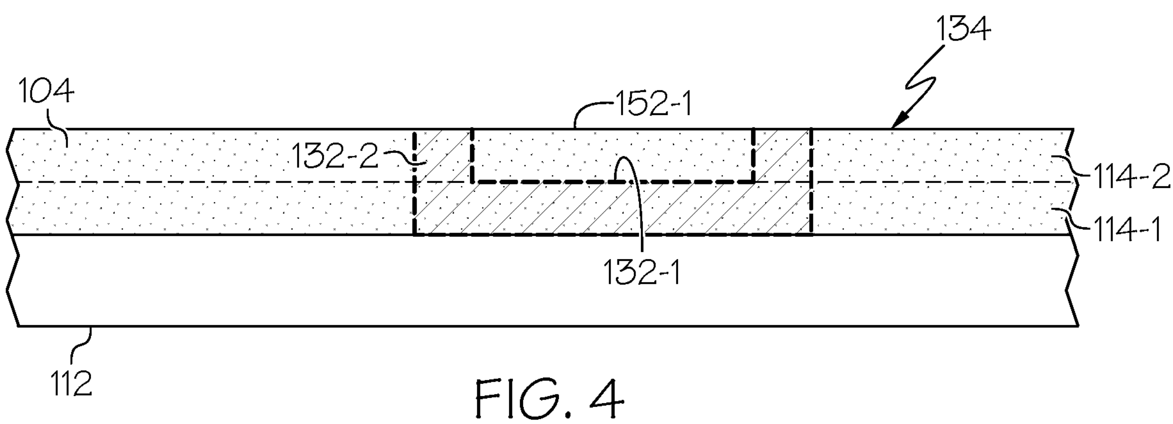

In one or more examples, under direction from the controller 144, the build platform 112 is selectively indexed down by one layer of thickness. As illustrated in FIG. 4, under direction from the controller 144, the powder-deposition apparatus 102 traverses the first powder layer 114-1 and deposits the powder 104 to form a second powder layer 114-2 (e.g., a successive second one of the plurality of powder layers 114). After formation of the second powder layer 114-2, under direction from the controller 144, the binder-delivery apparatus 106 is activated and traverses the second powder layer 114-2 to strategically deposit the binder 108 and bond a selected portion of the powder 104 of the second powder layer 114-2. Bonding the selected portion of the powder of the second powder layer 114-2 forms a second shell layer 132-2 (e.g., a successive second one of the plurality of shell layers 132) on the first shell layer 132-1. After formation of the second shell layer 132-1, a non-bonded portion of the powder 104 (e.g., a first powder core layer 152-1) is bound by the first shell layer 132-1 and the second shell layer 132-2. Another non-bonded portion of the powder 104 remains packed around the first shell layer 132-1 and the second shell layer 132-2.

In one or more examples, the second shell layer 132-2 forms a section of a continuous side portion (e.g., having a closed cross section) of the binder shell 116. In one or more examples, the second shell layer 132-2 has a thickness that is approximately 0.0625 inch (1.587 millimeters). In one or more examples, the thickness of the second shell layer 132-1 is less than approximately 0.0625 inch (1.587 millimeters).

Figure 5:
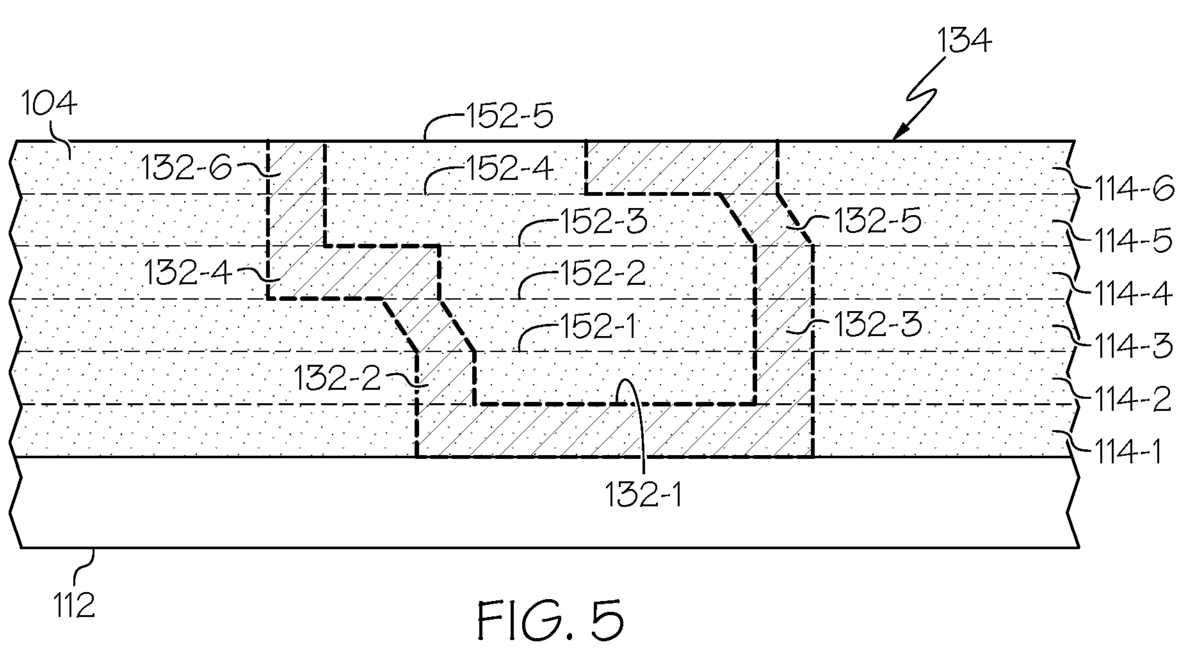
Figure 6:
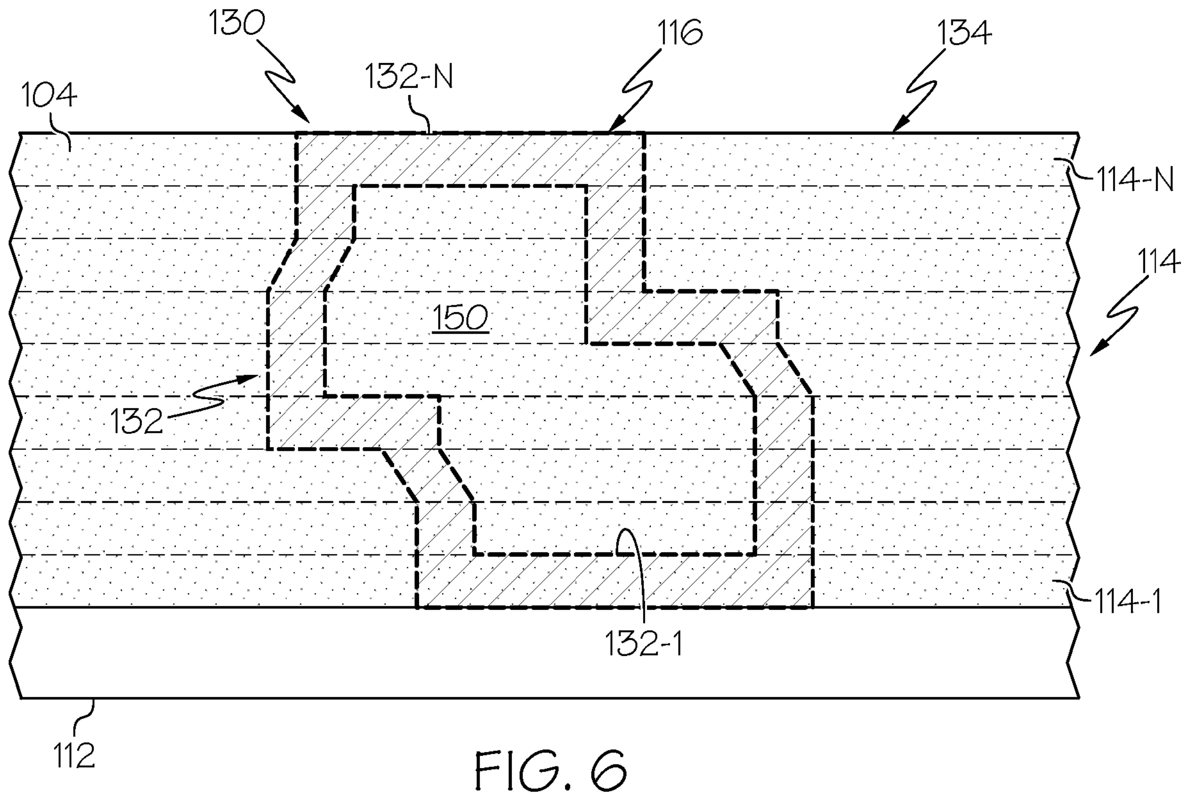
FIG. 6 schematically illustrates an example of an additively manufactured object that includes a binder shell and a powder core bound by the binder shell.

In one or more examples, as illustrated in FIGS. 5 and 6, this forming and bonding procedure is repeated a number of times to produce a number of intermediate powder layers 114, to produce a number of intermediate shell layers 132, and, ultimately to produce the object 130 (FIG. 6) that includes the binder shell 116 and the powder core 150 bound by the binder shell 116.

Generally, each successive one of the plurality of powder layers 114 is formed on the previously formed and underlying one of the plurality of powder layers 114 and the previously formed and underlying one of the plurality of shell layers 132. Each successive one of the plurality of shell layers 132 is formed on and is attached to the previously formed and underlying one of the plurality of shell layers 132 to form a new shell layer 132 and a new powder core layer 152. After formation of each successive one of the shell layers 132, an additional non-bonded portion of the powder 104 (e.g., each successive one of a plurality of powder core layers 152) is bound by the first shell layer 132-1 and the plurality of intermediate shell layers 132 (e.g., e.g., shell layers 132-2 through 132-8). An additional non-bonded portion of the powder 104 remains packed around the first shell layer 132-1 and the plurality of intermediate shell layers 132.

In one or more examples, each one of the plurality of intermediate shell layers 132 (e.g., shell layers 132-2 through 132-8) forms a subsequent section of the continuous side portion (e.g., having a closed cross section) of the binder shell 116. In one or more examples, each one of the plurality of intermediate shell layers 132 (e.g., shell layers 132-2 through 132-8) has a thickness that is approximately 0.0625 inch (1.587 millimeters). In one or more examples, the thickness of each one of the plurality of intermediate shell layers 132 (e.g., shell layers 132-2 through 132-8) is less than approximately 0.0625 inch (1.587 millimeters). In one or more examples, the thickness of each one of the plurality of intermediate shell layers 132 (e.g., shell layers 132-2 through 132-8) is the same. In one or more examples, the thickness of at least one of the plurality of intermediate shell layers 132 (e.g., shell layers 132-2 through 132-8) is different that at least another one of the plurality of intermediate shell layers 132 (e.g., shell layers 132-2 through 132-8).

As illustrated in FIG. 6, in one or more examples, under direction from the controller 144, the powder-deposition apparatus 102 traverses the preceding one of the powder layer 114 (e.g., powder layer 114-8) and deposits the powder 104 to form a final powder layer 114-N (e.g., a final one of the plurality of powder layers 114). After formation of the final powder layer 114-N, under direction from the controller 144, the binder-delivery apparatus 106 is activated and traverses the final powder layer 114-N to strategically deposit the binder 108 and bond a selected portion of the powder 104 of the final powder layer 114-N. Bonding the selected portion of the powder 104 of the final powder layer 114-N forms a final shell layer 132-N (e.g., a final one of the plurality of shell layers 132) of the object 130. After formation of the final shell layer 132-N, a non-bonded portion of the powder 104 (e.g., the powder core 150) is bound by the binder shell 116. Another non-bonded portion of the powder 104 remains packed around the binder shell 116.

In one or more examples, the final shell layer 132-N forms or defines a top portion of the binder shell 116. In one or more examples, the final shell layer 132-1 has a thickness that is approximately equal to a thickness of the final powder layer 114-N. In one or more examples, the thickness of the final shell layer 132-N is approximately 0.0625 inch (1.587 millimeters). In one or more examples, the thickness of the final shell layer 132-N is less than approximately 0.0625 inch (1.587 millimeters).

As illustrated in FIG. 6, in one or more examples, the top portion of the binder shell 116 is formed entirely by a single shell layer 132 (e.g., the final shell layer 132-N). In other examples, the top portion of the binder shell 116 may be formed by more than one shell layer 132. The number of shell layers 132 used to form the top portion of the binder shell 116 may depend on a desired overall thickness of the binder shell 116, a desired thickness of top portion of the binder shell 116, the contour of the top portion of the binder shell 116, the overall dimensions of the object 130, the thickness of a given powder layer 114, and a volume and/or density of the powder 104 bound by the binder shell 116 (e.g., the powder core 150), among other factors.

Referring to FIG. 6, in one or more examples, the binder shell 116 has a contour that approximately matches a net shape of the object 130. As such, the bottom portion, the side portion, and/or the top portion of the binder shell 116 may have one or more straight sections and/or one or more contoured sections. Similarly, the bottom portion, the side portion, and/or the top portion of the binder shell 116 may include one or more horizontally oriented sections, one or more vertically oriented sections, and/or one or more obliquely oriented sections.

Generally, the binder shell 116 has a closed cross-sectional shape suitable to enclose and contain an entirety of the powder core 150 formed of unbonded powder. In one or more examples, the binder shell 116 has a thickness of approximately 0.0625 inch (1.587 millimeters). In one or more examples, the binder shell 116 has a thickness that is less than approximately 0.0625 inch (1.587 millimeters). In one or more examples, the thickness of the binder shell 116 is constant. In one or more examples, the thickness of the binder shell 116 varies.

Referring again to FIG. 1, in one or more examples, the system 100 includes a consolidation apparatus 118. The consolidation apparatus 118 is configured to consolidate, compact, settle, pack, or otherwise densify at least a portion of the powder 104 that is bound by the binder shell 116 (e.g., the portion of the powder 104 that is located within or that is enclosed by the plurality of shell layers 132) and that forms the powder core 150 (FIG. 6) of the object 130. Consolidating the powder core 150 of the object 130, in the brown condition, may achieve a more fully dense object 130 in the finished condition (e.g., after the sintering operation) than that produced by current binder jetting processes.

In one or more examples, the controller 144 is configured to generate command signals to control movement and/or operation the consolidation apparatus 118. For example, the controller 144 selectively controls movement and/or actuation of the consolidation apparatus 118 according to the predetermined plan, stored in the controller 144.

Figure 8:
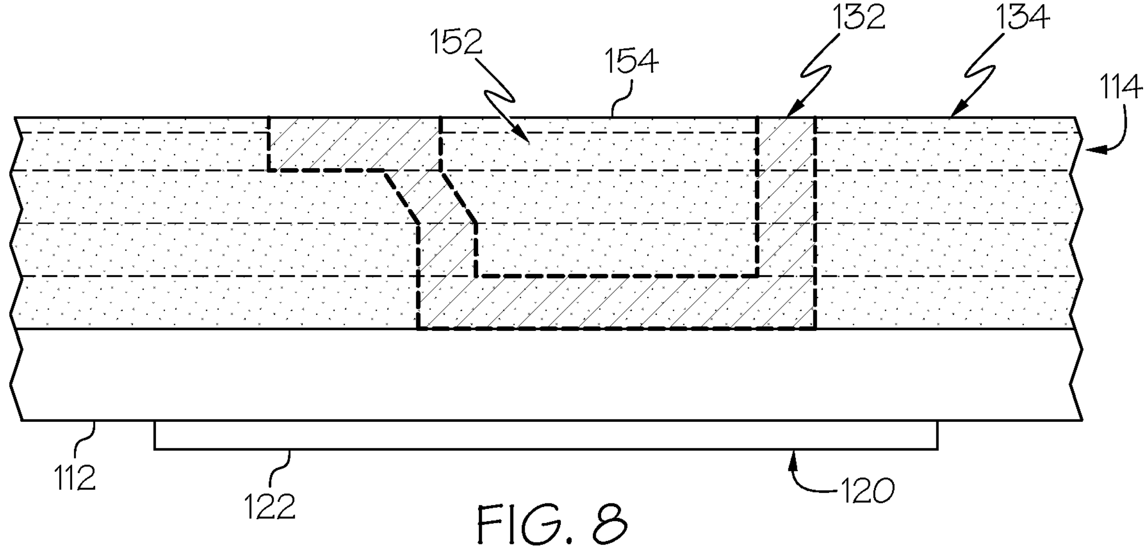
Figure 9:
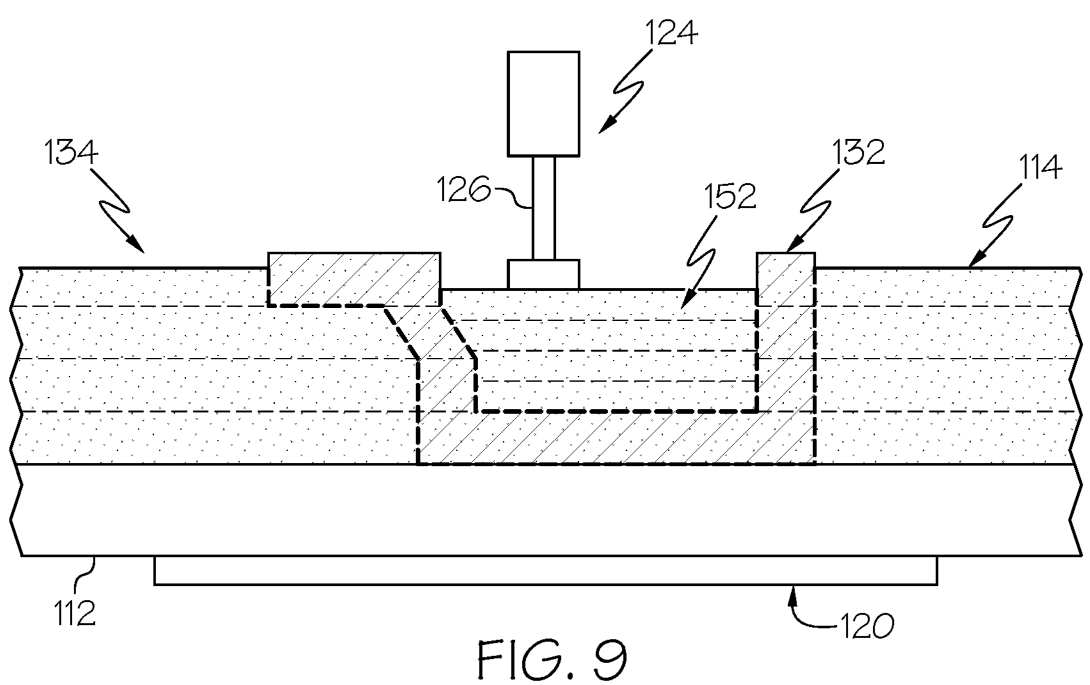
FIGS. 9 and 10, collectively, schematically illustrate an example of densifying powder bound by a portion of the binder shell using a tamping head.

Referring to FIGS. 1, 8 and 9, in one or more examples, the consolidation apparatus 118 includes a vibration mechanism 120. The vibration mechanism 120 is coupled to the build platform 112. The vibration mechanism 120 is configured to compact (e.g., settle) the portion of the powder 104 bound by (e.g., located within) the binder shell 116. The vibration mechanism 120 may include any one of various suitable types of vibration mechanisms used to produce and transmit vibratory energy to the powder bed 134.

In one or more examples, the vibration mechanism 120 includes an ultrasonic vibration element 122. The ultrasonic vibration element 122 is configured to generate ultrasonic vibrations. The ultrasonic vibrations transmit mechanical shocks to the build platform 112 and into the powder bed 134 to shake the powder 104 located in the build chamber 110 in order to obtain a denser and/or more uniform powder packing.

In one or more examples, the vibration mechanism 120 may be used to achieve a desired density of the powder 104 (e.g., the powder core 150). Generally, the vibratory energy (e.g., the ultrasonic vibrations) produced by the vibration mechanism 120 and transmitted to the powder 104 is sufficient to pack the powder 104. Ideally, the vibratory energy is sufficient to prevent post-formation settling of the powder 104 after application of the binder 108 and formation of the plurality of shell layers 132 and to prevent post-formation settling of the powder 104 forming the powder core 150 within the binder shell 116 before or during the solidifying (e.g., sintering) operation. The vibratory energy is also configured to prevent pluming of the powder 104 in response to the vibratory energy.

Figure 7:
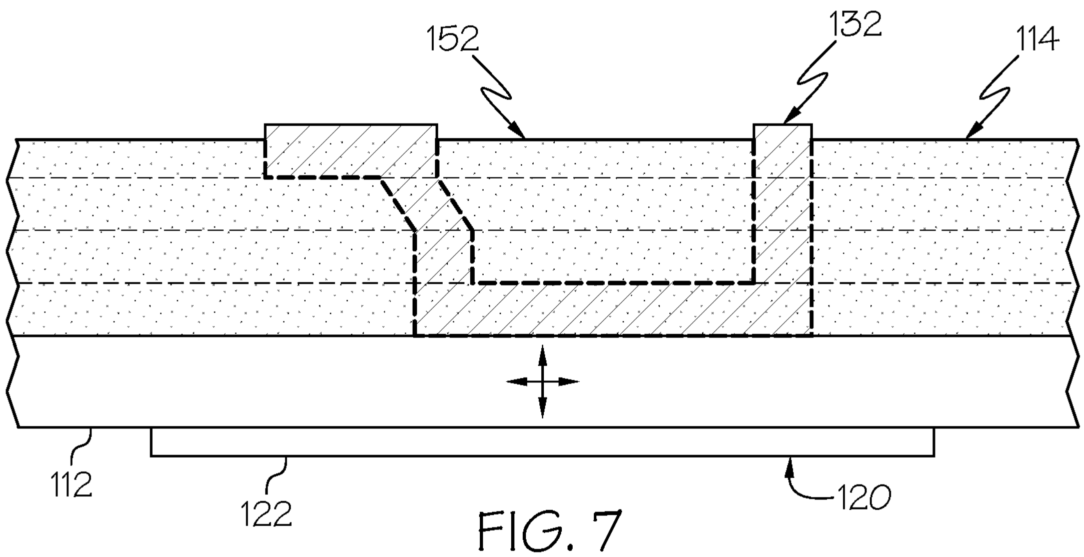
FIGS. 7 and 8, collectively, schematically illustrate an example of densifying powder bound by a portion of the binder shell using a vibration mechanism.

As illustrated in FIG. 7, in one or more examples, under direction from the controller 144, the vibration mechanism 120 is activated and vibratory energy is transferred to the powder bed 134 to compact the powder 104 in the powder bed 134. In one or more examples, the vibration mechanism 120 is activated after formation of each one of the plurality of powder layers 114. In one or more examples, the vibration mechanism 120 is activated after formation of each one of the plurality of shell layers 132.

As illustrated in FIG. 7, following compaction of the powder 104, the powder 104 in the powder bed 134 may settle and become more densely packed. As such, a gap may be formed between a top surface of the previously formed shell layer 132 and a top surface of the powder bed 134 (e.g., a top surface of the previously formed powder layer 114 and/or the previously formed powder core layer 152). As illustrated in FIG. 8, in one or more examples, under direction from the controller 144, the powder-deposition apparatus 102 traverses the previously formed powder layer 114 and deposits the powder 104 to recoat the powder bed 134 and form a fill layer 154. The fill layer 154 fills any gaps exposed during the vibratory compaction operation and creates a smooth layer of powder 104 prior to formation of the subsequent powder layer 114.

Referring to FIGS. 1 and 9-12, in one or more examples, the consolidation apparatus 118 includes a tamping mechanism 124. The tamping mechanism 124 is configured to compact (e.g., compress) the portion of the powder 104 bound by (e.g., located within) the binder shell 116. The tamping mechanism 124 may include any one or various suitable types of tamping mechanisms used to apply a compression force to the powder bed 134.

In one or more examples, the tamping mechanism 124 is movable relative to the build platform 112. In one or more examples, the tamping mechanism 124 moves horizontally relative to the build platform 112 after each successive one of the plurality of powder layer 114 and/or shell layers 132 is formed. In one or more examples, the tamping mechanism 124 moves horizontally relative to the build platform 112 after each successive one of the plurality of powder layers 114 and/or shell layers 132 is formed. In one or more examples, the tamping mechanism 124 has multiple degrees of freedom to accommodate multi-axis movement for tamping mechanism 124 at any location.

In one or more examples, the system 100 includes a tamping-mechanism actuator 148 that is coupled to the tamping mechanism 124. The tamping-mechanism actuator 148 is configured to drive movement of the tamping mechanism 124. In one or more examples, the tamping-mechanism actuator 148 includes, or takes the form of, a linear actuator, a robotic actuator arm (e.g., a six-axis robotic actuator arm), and the like. In one or more examples, a tamper actuator (e.g., tamping-mechanism actuator 148) is coupled to the base (as illustrated in FIG. 1). In one or more examples, a tamper (e.g., tamping mechanism 124) is coupled to and movable relative to the base by the tamper actuator. The tamper is configured to densify the powder.

In one or more examples, the tamping mechanism 124 may be used in addition to the vibration mechanism 120 if the vibratory energy is not sufficient to achieve the desired density of the powder 104 (e.g., the powder core 150). In one or more examples, the tamping mechanism 124 may be used as an alternative to the vibration mechanism 120 to achieve the desired density of the powder 104 (e.g., the powder core 150). For example, the consolidation apparatus 118 may include both the vibration mechanism 120, coupled to the build platform 112 and configured to compact the portion of the powder 104 bound by the binder shell 116, and the tamping mechanism 124, configured to compress the portion of the powder 104 bound by the binder shell 116.

Referring to FIG. 9, in one or more examples, the tamping mechanism 124 includes a tamping head 126. The tamping head 126 is configured to consecutively compress sections of the portion of the powder 104 bound by the binder shell 116 (e.g., sections of each one of the plurality of powder core layers 152).

In one or more examples, under direction from the controller 144, the tamping head 126 is moved along the formed powder core layer 152 according to a predetermined plan stored in the controller 144. As the tamping head 126 moves along the powder core layer 152, under direction from the controller 144, the tamping head 126 is selectively actuated to apply a compressive force to selected locations along the powder core layer 152 and compact the powder 104 bound by the plurality of shell layers 132. In one or more examples, positioning of the tamping head 126 is controlled utilizing CNC commands such that the compression force is applied only to locations along the powder core layer 152 bound by an associated shell layer 132 without damaging the shell layer 132. In one or more examples, the tamping head 126 is positioned and actuated after formation of each one of the plurality of powder layers 114. In one or more examples, the tamping head 126 is positioned and actuated after formation of each one of the plurality of shell layers 132.

Figure 10:
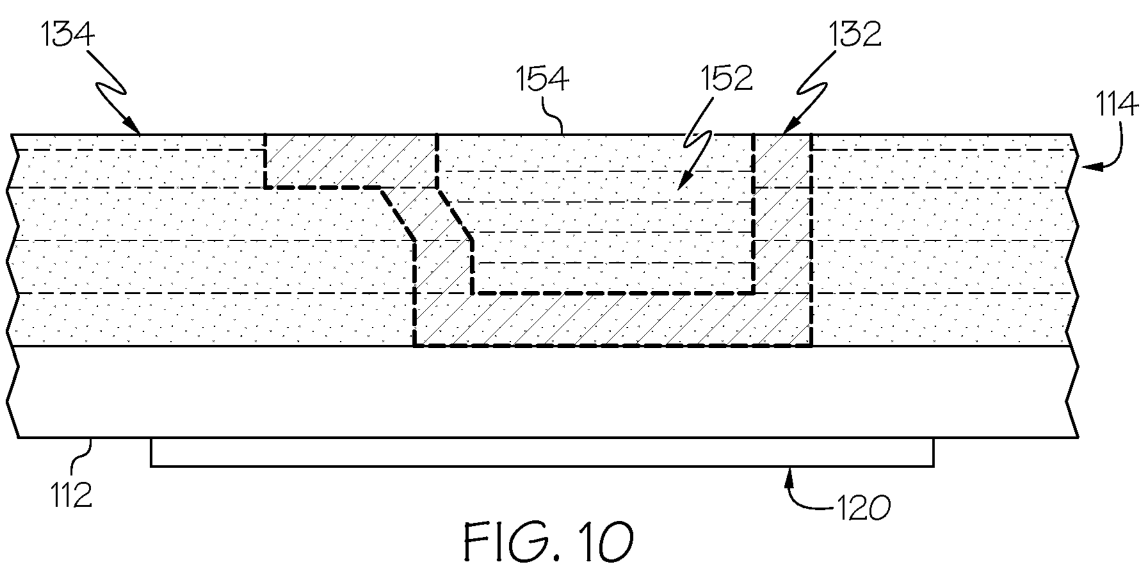

As illustrated in FIG. 9, following compaction of the powder 104, the powder 104 forming the plurality of powder core layers 152 may settle and become more densely packed. As such, a gap may be formed between a top surface of the previously formed shell layer 132 and a top surface of the powder core 150 (e.g., a top surface of the previously formed powder core layer 152). As illustrated in FIG. 10, in one or more examples, under direction from the controller 144, the powder-deposition apparatus 102 traverses the previously formed powder layer 114 and deposits the powder 104 to recoat the powder bed 134 and form a fill layer 154 over the powder core 150. The fill layer 154 fills any gaps exposed during the compression operation and creates a smooth layer of powder 104 prior to formation of the subsequent powder layer 114.

Figure 11:
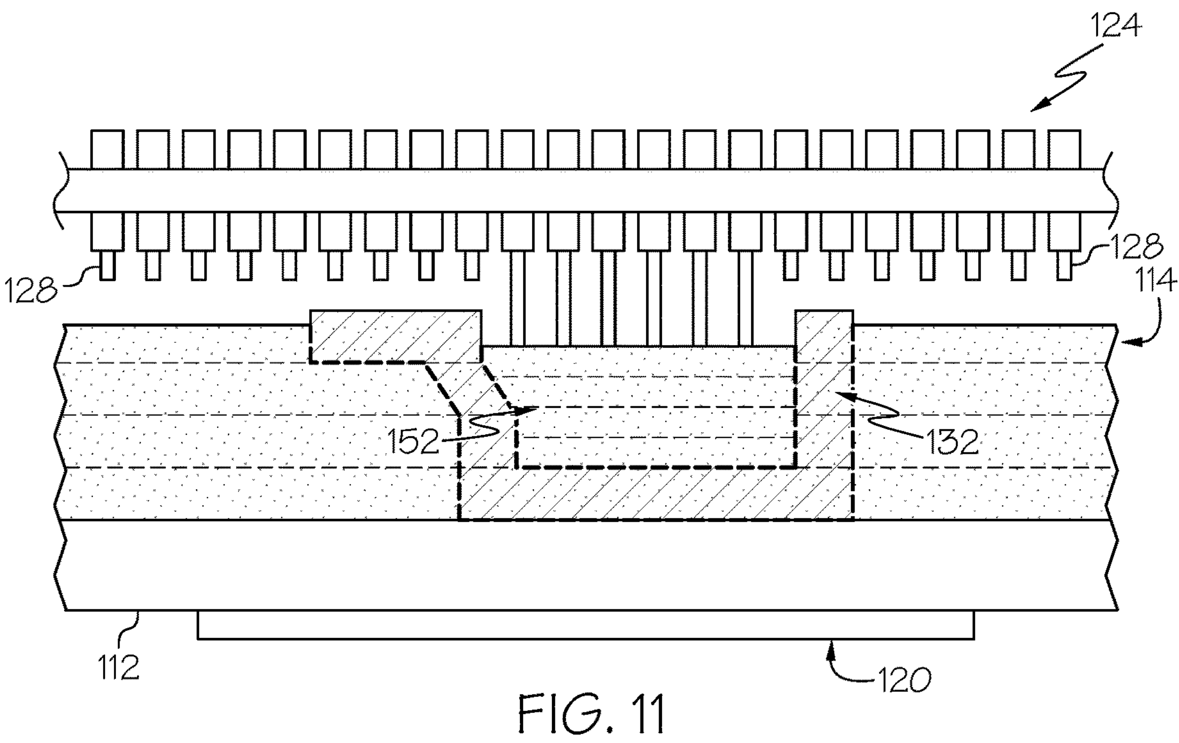
FIGS. 11 and 12, collectively, schematically illustrate an example of densifying powder bound by a portion of the binder shell using a plurality of tamping pins.
Figure 12:
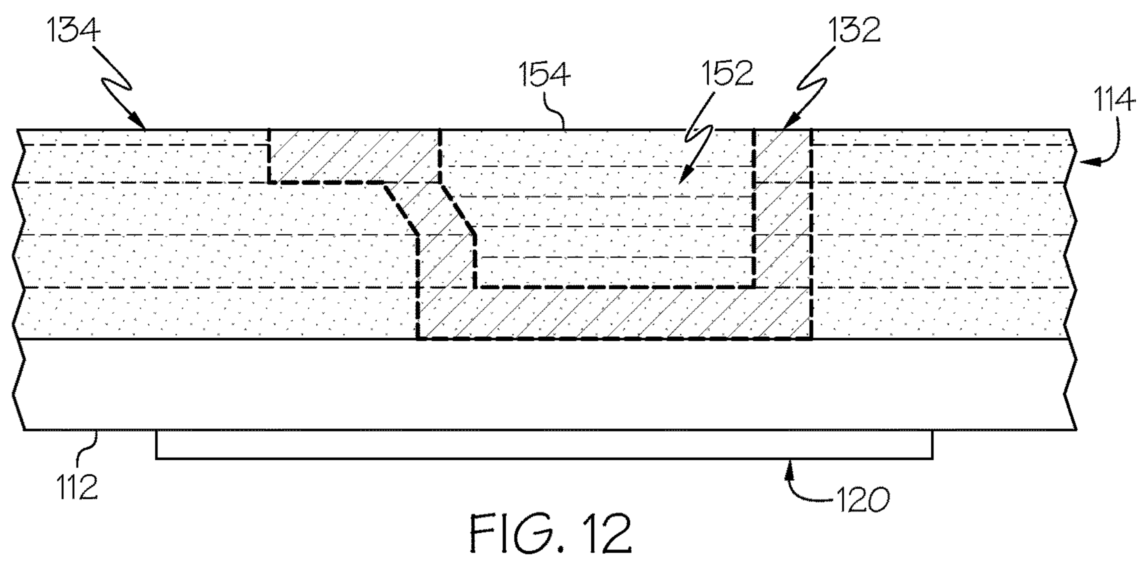

Referring to FIGS. 11 and 12, in one or more examples, the tamping mechanism 124 includes a plurality of tamping pins 128. The plurality of tamping pins 128 is configured to simultaneously compress an entirety of the portion of the powder 104 bound by the binder shell 116 (e.g., an entirety of each one of the plurality of powder core layers 152).

In one or more examples, under direction from the controller 144, the plurality of tamping pins 128 is positioned over the powder bed 134. Under direction from the controller 144, selected ones of the plurality of tamping pins 128 are selectively actuated to apply a compressive force to a plurality of locations along the powder core layer 152, according to a predetermined plan stored in the controller 144, and compact the powder 104 bound by the plurality of shell layers 132. In one or more examples, selective actuation of selected ones of the plurality of the tamping pins 128 is controlled utilizing CNC commands such that the compression force is applied only to locations along the powder core layer 152 bound by an associated shell layer 132 without damaging the shell layer 132. In one or more examples, the plurality of tamping pins 128 is positioned and selectively actuated after formation of each one of the plurality of powder layers 114. In one or more examples, the tamping head 126 the plurality of tamping pins 128 is positioned and selectively actuated after formation of each one of the plurality of shell layers 132.

As illustrated in FIG. 11, following compaction of the powder 104, the powder 104 forming the plurality of powder core layers 152 may settle and become more densely packed. As such, a gap may be formed between a top surface of the previously formed shell layer 132 and a top surface of the powder core 150 (e.g., a top surface of the previously formed powder core layer 152). As illustrated in FIG. 12, in one or more examples, under direction from the controller 144, the powder-deposition apparatus 102 traverses the previously formed powder layer 114 and deposits the powder 104 to recoat the powder bed 134 and form a fill layer 154 over the powder core 150. The fill layer 154 fills any gaps exposed during the compression operation and creates a smooth layer of powder 104 prior to formation of the subsequent powder layer 114.

Figure 13:
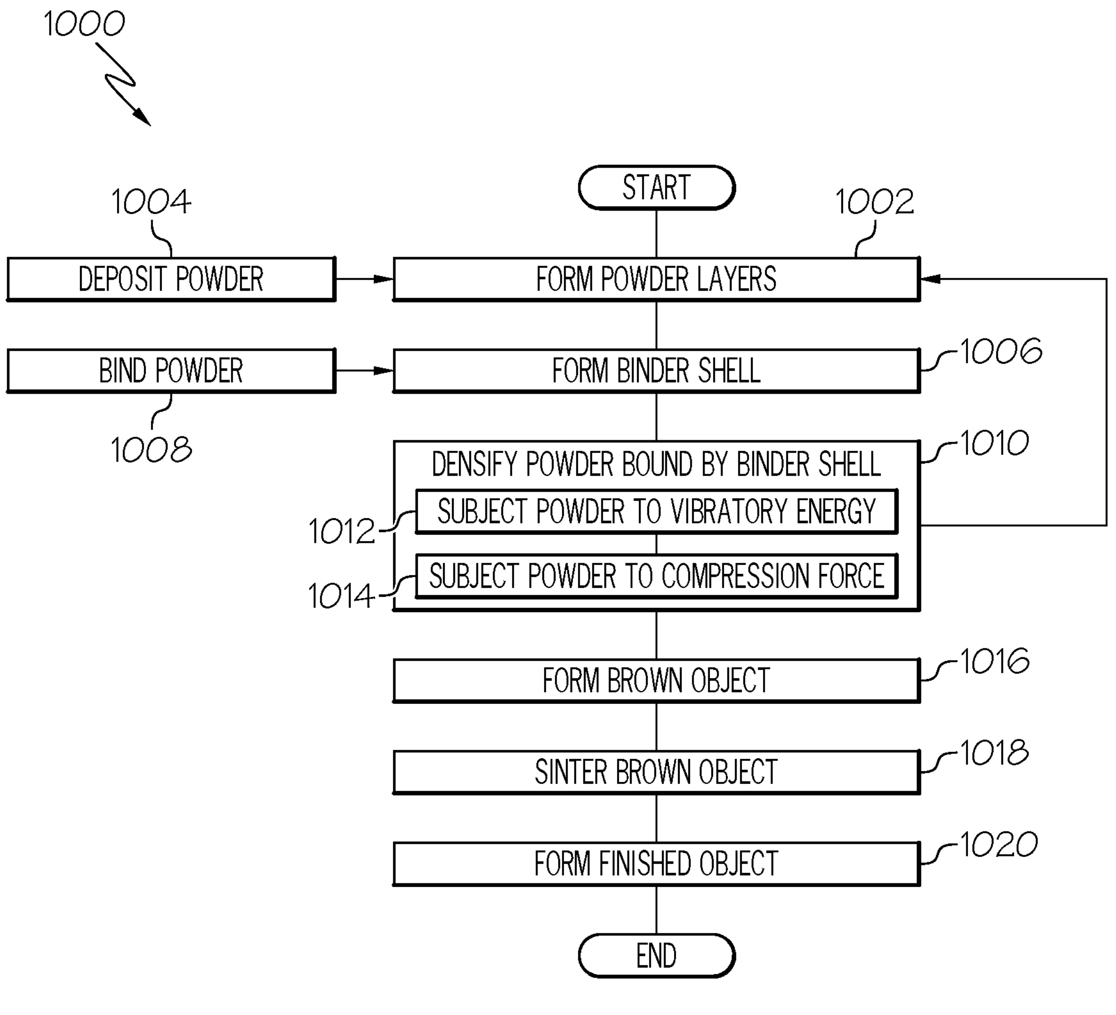
FIG. 13 is a flow diagram of an example of a method of additively manufacturing an object.

FIG. 13 illustrates an example of the method 1000 for forming the object 130. According to one or more examples, the method 1000 utilizes the system 100 (FIG. 1) to make the object 130. Generally, the method 1000 includes a plurality of operational steps to implement the forming, bonding, and consolidating procedure described above with respect to FIGS. 2-12.

In one or more examples, the method 1000 includes a step of (block 1002) successively forming the plurality of powder layers 114. In one or more examples, the method 1000 includes a step of (block 1004) depositing the powder 104 to successively form the plurality of powder layers 114. In one or more examples, according to the method 1000, the step of (block 1004) depositing the powder 104 and the step of (block 1002) successively forming the plurality of powder layers 114 is performed using the powder-deposition apparatus 102.

In one or more examples, the method 1000 includes a step of (block 1006) successively forming the binder shell 116. In one or more examples, the method 1000 includes a step of (block 1008) bonding select regions of each one of the plurality of powder layers 114 before forming each successive one of the plurality of powder layers 114 to successively form the binder shell 116. In one or more examples, according to the method 1000, the step of (block 1006) successively forming the binder shell 116 includes a step of delivering the binder 108 at the select regions of each one of the plurality of powder layers 114 and a step of successively forming the plurality of shell layers 132 of the binder shell 116 that enclose the portion of the powder 104 bound by the binder shell 116. In one or more examples, according to the method 1000, the step of (block 1008) bonding select regions of each one of the plurality of powder layers 114 and the step of (block 1006) successively forming the binder shell 116 is performed using the binder-delivery apparatus 106

In one or more examples, the method 1000 includes a step of (block 1010) densifying the portion of the powder 104 bound by the binder shell 116 (e.g., the powder core 150). In one or more examples, according to the method 1000, the step of (block 1010) densifying the portion of the powder 104 bound by the binder shell 116 occurs after the step of (block 1002) forming each one of the plurality of powder layers 114. In one or more examples, according to the method 1000, the step of (block 1010) densifying the portion of the powder 104 bound by the binder shell 116 occurs after the step of forming each one of the plurality of shell layers 132. In one or more examples, according to the method 1000, the step of (block 1010) densifying the portion of the powder 104 bound by the binder shell 116 is performed using the consolidation apparatus 118.

In one or more examples, according to the method 1000, the step of (block 1010) densifying the portion of the powder 104 bound by the binder shell 116 includes a step of (block 1012) subjecting the portion of the powder 104 bound by the binder shell 116 to vibratory energy. In one or more examples, the step of (block 1012) subjecting the portion of the powder 104 bound by the binder shell 116 to vibratory energy is performed using the vibration mechanism 120.

In one or more examples, according to the method 1000, the step of (block 1010) densifying the portion of the powder 104 bound by the binder shell 116 includes a step of (block 1014) subjecting the portion of the powder 104 bound by the binder shell 116 to a compression force. In one or more examples, the step of (block 1014) subjecting the portion of the powder 104 bound by the binder shell 116 to the compression force is performed using the tamping mechanism 124.

In one or more examples, according to the method 1000, the step of (block 1010) densifying the portion of the powder 104 bound by the binder shell 116 includes the step of (block 1012) subjecting the portion of the powder 104 bound by the binder shell 116 to the vibratory energy and the step of (block 1014) subjecting the portion of the powder 104 bound by the binder shell 116 to the compression force.

In one or more examples, according to the method 1000, the step of (block 1012) subjecting the portion of the powder 104 bound by the binder shell 116 to the vibratory energy occurs before the step of forming each successive one of the plurality of shell layers 132 of the binder shell 116. In one or more examples, according to the method 1000, the step of (block 1014) subjecting the portion of the powder 104 bound by the binder shell 116 to the compression force occurs after the step of forming each successive one of the plurality of shell layers 132 of the binder shell 116.

In one or more examples, the method 1000 includes a step of forming the fill layer 154 after the step of (block 1010) densifying the portion of the powder 104 bound by the binder shell 116.

According to the method 1000, the operational steps of (block 1004) depositing the powder 104, (block 1002) forming the powder layer 114, (block 1008) binding the powder 104, (block 1004) forming the binder shell 116, and (block 1010) densifying the powder 104 may be repeated a number of times to successively form the plurality of powder layers 114, to successively form the plurality of shell layers 132, to successively densify the portion of the powder 104 bound by the binder shell 116 and to, ultimately, form the object 130 in the brown condition (block 1016).

In one or more examples, after the object 130 is fully formed, the object 130 is in a green condition (e.g., a "green part") and is encapsulated in a non-bonded portion of the powder 104 (e.g., as shown in FIGS. 1 and 6) and is left to cure and gain strength. Upon curing, the object 130 is in the brown condition.

In one or more examples, the method 1000 includes a step of (block 1018) sintering the object 130. Sintering the object 130 removes the binder 108 from the binder shell 116 and solidifies (e.g., bonds together) the powder 104 of the powder core 150 and the powder 104 of the binder shell 116. Typically, the sintering process takes place in a furnace with a controlled atmosphere, where the part is heat treated and the binder 108 is burnt away. The sintering process fuses the particles together and results in strong part with a low porosity. Upon sintering, the object 130 is formed in the finished condition (block 1020).

Throughout the present disclosure, examples of the operational steps of the method 1000 and/or components of the system 100 described with respect to depositing the powder 104 to form one of the plurality of powder layers 114 and bonding the powder 104 to form one of the plurality of shell layers 132 are equally applicable to operational steps and components for depositing the powder 104 to form any other one of the plurality of powder layers 114 and bonding the powder 104 to form any other one of the plurality of shell layers 132. Furthermore, additional components, such as additional powder-deposition apparatuses, additional binder-delivery apparatuses, additional consolidation apparatuses, powder hoppers, regulators, valves, sensors, and the like may be included in the system 100 without departing from the scope of the present disclosure.

As described herein, the controller 144 communicates with and/or controls various components of the system 100. In one or more examples, the controller 144 is a computing device that includes a processor and memory. The memory may be a computer-readable memory medium and is configured to store data required for operation of the system 100 and/or implementation of the method 1000. Computer-readable memory medium is any medium which can be used to store information which can later be accessed by the processor. Computer-readable memory medium may include computer memory and data storage devices. Computer memory may be a fast-access memory and may be used to run program instructions executable by the processor. Computer memory may include random access memory (RAM), flash memory, and read-only memory (ROM). Data storage devices may be physical devices and may be used to store any information or computer program which may be accessed by the processor, such as an operating system, computer programs, program modules, and program data. Data storage devices and their associated computer-readable memory media provide storage of computer-readable instructions, data structures, program modules, and other data for the system. Data storage devices may include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

In one or more examples, the memory includes data packets comprised of data required for controlled operation of the system 100. For example, one data packet may contain data required for control of the powder-deposition apparatus 102, another data packet may contain data required for control of the binder-delivery apparatus 106, and another data packet may contain data required for control of the consolidation apparatus 118. The processor communicates with the memory to retrieve the necessary data for controlling operation of the system 100.

In one or more examples, the subject matter of the present disclosure is described with reference to acts and symbolic representations of operations that are performed by one or more computers or computer systems, unless indicated otherwise. As such, it will be understood that such acts and operations, which are at times referred to as being computer-executed, include the manipulation by one or more processors of the system 100, such as of the controller 144, via electrical signals representing data in a structured form. This manipulation transforms the data or maintains it at specific locations in the memory of the system 100, which reconfigures or otherwise alters the operation of the system 200 in a manner well understood by those skilled in the art. The data structures where data is maintained are physical locations of the memory that have particular properties defined by the format of the data. However, although one or more examples are described in the foregoing context, it is not meant to be limiting, as those skilled in the art will appreciate, in that some of the acts and operations described herein may also be implemented in hardware, software, and/or firmware and/or some combination thereof.

Figure 14:
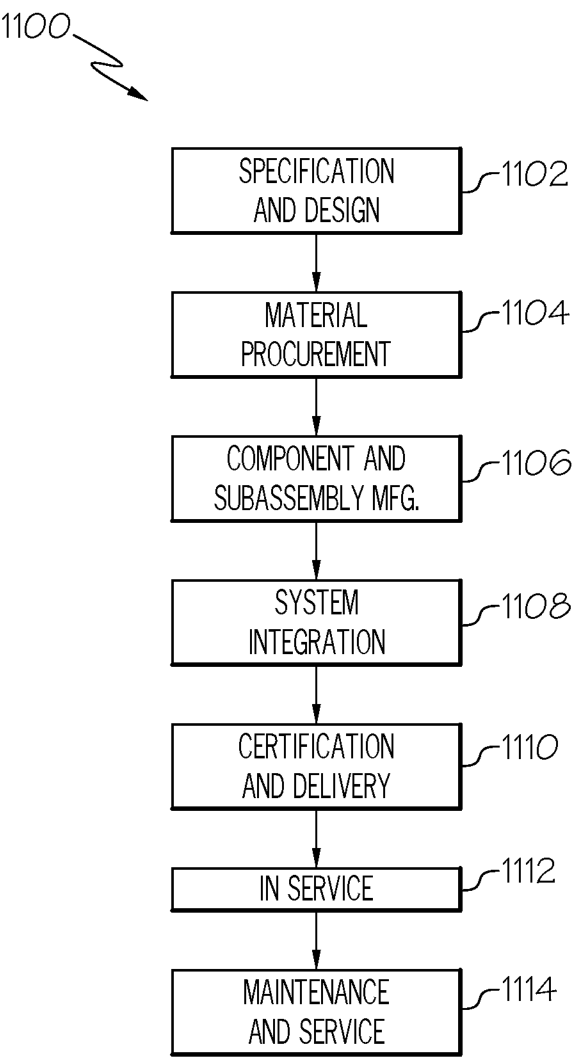
FIG. 14 is a flow diagram of an aircraft manufacturing and service methodology.
Figure 15:
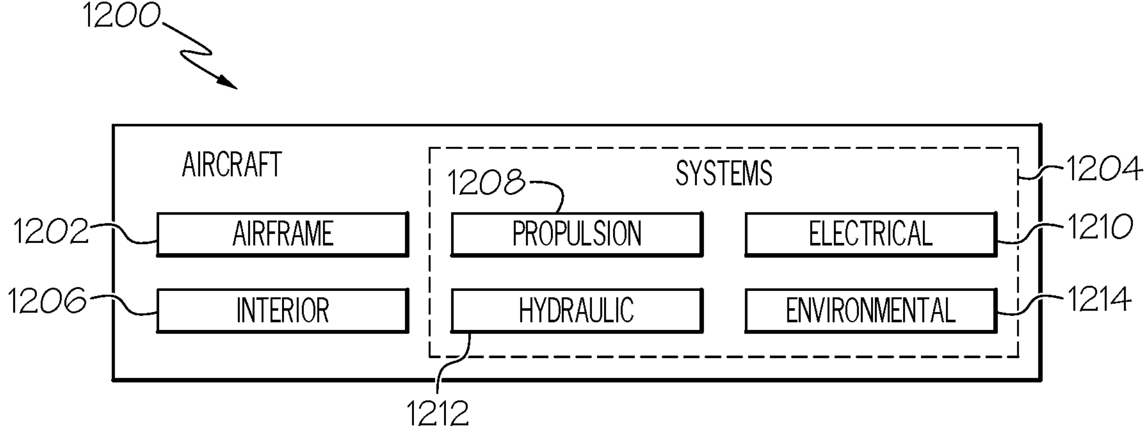
FIG. 15 is a schematic block diagram of an example of an aircraft.

Referring now to FIGS. 14 and 15 examples of the additive manufacturing system 100, the method 1000, and the additively manufactured object 130 may be used in the context of an aircraft manufacturing and service method 1100, as shown in the flow diagram of FIG. 14 and an aircraft 1200, as schematically illustrated in FIG. 15.

Referring to FIG. 15, in one or more examples, the aircraft 1200 includes an airframe 1202, an interior 1206, and a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a guidance system, a weapons system, and the like. The object 130 made in accordance with the method 1000, and using the additive manufacturing system 100, may be a structure, an assembly, a sub-assembly, a component, a part, or any other portion of the aircraft 1200, such as a portion of the airframe 1202 or the interior 1206.

Referring to FIG. 14 during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 14 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the method 1000, and the object 130 shown and described herein may be employed during any one or more of the stages of the manufacturing and service method 1100 shown in the flow diagram illustrated by FIG. 14. In an example, implementation of the disclosed system 100 and method 1000 may form a portion of component and subassembly manufacturing (block 1106) and/or system integration (block 1108). For example, assembly of the aircraft 1200 and/or components thereof (e.g., the object 130) using implementations of the disclosed system 100 and method 1000 may correspond to component and subassembly manufacturing (block 1106) and may be prepared in a manner similar to components or subassemblies prepared while the aircraft 1200 is in service (block 1112). Also, implementations of the disclosed system 100 and method 1000 may be utilized during system integration (block 1108) and certification and delivery (block 1110). Similarly, implementations of the disclosed system 100 and method 1000 may be utilized, for example and without limitation, while the aircraft 1200 is in service (block 1112) and during maintenance and service (block 1114).

Although an aerospace (e.g., aircraft or spacecraft) example is shown, the examples and principles disclosed herein may be applied to other industries, such as the automotive industry, the construction industry, the wind turbine industry, the electronics industry, and other design and manufacturing industries. Accordingly, in addition to aircraft and spacecraft, the examples and principles disclosed herein may apply to powder bed, binder jetting additive manufacturing processes used to form objects used with other vehicles (e.g., land vehicles, marine vehicles, construction vehicles, etc.), machinery, and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy. For example, the term "approximately" refers to a condition that is within 10% of the stated condition. However, the term "approximately" does not exclude a condition that is exactly the stated condition.

Those skilled in the art will appreciate that some of the elements, features, and/or components described and illustrated in FIGS. 1-12 and 15, referred to above, may be combined in various ways without the need to include other features described and illustrated in FIGS. 1-12 and 15, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-12 and 15, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Additionally, those skilled in the art will appreciate that not all elements described and illustrated in FIGS. 1-12 and 15, referred to above, need be included in every example and not all elements described herein are necessarily depicted in each illustrative example.

In FIGS. 13 and 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 13 and 14, referred to above, and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, and the object 130 have been shown and described, modifications may occur to those skilled in the art upon reading the specification. The present application includes such modifications and is limited only by the scope of the claims.

What is claimed is:

1. An additive manufacturing system comprising:
a build platform;
a recoater configured to deposit powder;
a base positioned over the build platform;
a printhead actuator coupled to the base;
a printhead coupled to and movable relative to the base by the printhead actuator, the printhead is configured to selectively deposit binder to the powder;
a tamper actuator coupled to the base;
a tamper coupled to and movable relative to the base by the tamper actuator, the tamper is configured to densify the powder; and
a controller programmed to cause:
the recoater to successively form a plurality of powder layers over the build platform;
the printhead to successively form a binder shell by applying the binder to bond select regions of each one of the plurality of powder layers before the recoater forms each successive one of the plurality of powder layers such that the binder shell is formed of bonded powder and the binder shell encloses an entirety of a powder core formed of unbonded powder; and
the tamper to selectively pack a portion of the unbonded powder bound within the binder shell during layer-by-layer formation.

2. The additive manufacturing system of claim 1, further comprising a vibrator coupled to the build platform and configured to compact the portion of the powder bound by the binder shell.

3. The additive manufacturing system of claim 2, wherein the vibrator comprises an ultrasonic vibration element configured to generate ultrasonic vibrations.

4. The additive manufacturing system of claim 1, wherein the tamper comprises a tamping head configured to consecutively compress sections of the portion of the powder bound by the binder shell.

5. The additive manufacturing system of claim 1, wherein the tamper comprises a plurality of tamping pins configured to simultaneously compress an entirety of the portion of the powder bound by the binder shell.

6. The additive manufacturing system of claim 4,
further comprising a vibrator coupled to the build platform and configured to compact a portion of the powder bound by the binder shell.

7. The additive manufacturing system of claim 1, wherein the printhead configured to apply droplets of the binder at the select regions of each successive one of the plurality of powder layers under direction of the controller.

8. The additive manufacturing system of claim 1, wherein the recoater comprises at least one of a powder roller, a blade, or a powder sprayer.

9. The additive manufacturing system of claim 1, further comprising a sintering furnace configured to burn away the binder of the bonded powder and to consolidate the bonded powder and the unbonded powder.

10. An additive manufacturing system comprising:
a power chamber;
a build platform;
a recoater configured to transfer powder from the powder chamber to the build platform;
a base positioned over the build platform;
a printhead actuator coupled to the base;
a printhead coupled to and movable relative to the base by the printhead actuator, the printhead is configured to deliver binder to the powder;
a tamper actuator coupled to the base;
a vibrator tamper coupled to and movable relative to the base by the tamper actuator, the tamper is configured to densify the powder; and
a controller programmed to cause:
the recoater to successively form a plurality of powder layers over the build platform;
the printhead to successively form a binder shell by bonding select regions of each one of the plurality of powder layers before the recoater forms each successive one of the plurality of powder layers such that the binder shell is formed of bonded powder and the binder shell encloses an entirety of a powder core formed of unbonded powder; and
the tamper to compact a portion of the unbound powder bound within the binder shell during layer-by-layer formation.

11. The additive manufacturing system of claim 10, further comprising a vibrator onfigured to compact the portion of the powder bound by the binder shell.

12. The additive manufacturing system of claim 11, wherein the vibrator is coupled to the build platform.

13. The additive manufacturing system of claim 11, wherein the vibrator comprises an ultrasonic vibration element configured to generate ultrasonic vibrations.

14. The additive manufacturing system of claim 11, wherein the tamper comprises a plurality of tamping pins configured to simultaneously compress an entirety of the unbonded powder bound by the binder shell.

15. The additive manufacturing system of claim 10, wherein the tamper comprises a tamping head configured to consecutively compress sections of the unbonded powder bound by the binder shell.

16. The additive manufacturing system of claim 10, wherein the tamper comprises a plurality of tamping pins configured to simultaneously compress an entirety of the unbonded powder bound by the binder shell.

17. The additive manufacturing system of claim 10, wherein the printhead is configured to apply droplets of the binder at the select regions of each successive one of the plurality of powder layers.

18. The additive manufacturing system of claim 10, further comprising a sintering furnace configured to burn away the binder of the bonded powder and to consolidate the bonded powder and the unbonded powder.

19. The additive manufacturing system of claim 10, wherein the recoater comprises at least one of a powder roller, a blade, or a powder sprayer.

20. The additive manufacturing system of claim 5, further comprising a vibrator coupled to the build platform and configured to compact a portion of the powder bound by the binder shell.

* * * * *